(12) United States Patent
Sugita et al.

(10) Patent No.: US 6,618,339 B2
(45) Date of Patent: Sep. 9, 2003

(54) CLOSURE ASSEMBLY FOR RECORD MEDIUM ENTRY PASSAGE

(75) Inventors: Koji Sugita, Saitama (JP); Akira Sanada, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/033,787

(22) Filed: Jan. 3, 2002

(65) Prior Publication Data

US 2002/0118625 A1 Aug. 29, 2002

(30) Foreign Application Priority Data

Feb. 28, 2001 (JP) ........................................ 2001-055158
Feb. 28, 2001 (JP) ........................................ 2001-055159

(51) Int. Cl.[7] .............................................. G11B 33/02
(52) U.S. Cl. ...................................................... 369/75.1
(58) Field of Search ............................... 369/75.1, 77.1, 369/77.2; 360/99.02, 99.06, 99.03, 99.07

(56) References Cited

U.S. PATENT DOCUMENTS 5,383,072 A * 1/1995 Lee ............................ 360/96.5
5,408,459 A * 4/1995 Kawaguchi et al. ....... 369/77.2
5,537,378 A * 7/1996 Uehara et al. .............. 369/77.2
5,940,245 A * 8/1999 Sasaki et al. ............ 360/99.06
6,192,019 B1 * 2/2001 Kurokawa et al. ......... 369/77.1

* cited by examiner

Primary Examiner—William Korzuch
Assistant Examiner—Jennifer M Dolan
(74) Attorney, Agent, or Firm—Sughrue Mion, PLLC

(57) ABSTRACT

A closure assembly 1 for opening and closing a record medium entry passage to load and unload a main housing of a record medium reproduction unit with a record medium has a door panel 13, a door panel moving gear 15, a stopper panel 14, and a stopper moving cam 16. The door panel 13 has a gear 21 to open and close a record medium insertion opening 19. The gear 21 engages with the door panel moving gear 15 which is resiliently biased to move the door panel 13 toward its closed position. The stopper panel 14 is moved by the turning of the stopper moving cam 16 to open and close the insertion opening. The stopper moving cam 16 is also resiliently biased to turn the stopper panel 14 toward its closed position. The door panel 13 and the stopper panel 14 close the insertion opening independently from each other. The insertion opening 19 is constituted by four beams 25 one of which is formed with a hole 29. The stopper panel 14 has a hook 32 formed with a dent 39. The hole 29 is provided with a protrusion 37 on a peripheral wall 29a of the hole 29. The protrusion 37 engages with the dent 39 when the hook 32 is undesirably pushed inward in the main housing by an undesired insertion of a compact disk while the hook is received in the insertion opening 19.

11 Claims, 8 Drawing Sheets

FIG. 23
RELATED ART

CLOSURE ASSEMBLY FOR RECORD MEDIUM ENTRY PASSAGE

BACKGROUND OF THE INVENTION

1. Field of the Invention

The present invention relates to a closure assembly for a record medium entry passage to load and unload a main housing of a CD player, a CD changer, or the like with a record medium.

2. Related Art

Some automobiles are mounted with one of various types of car audio units including a record medium reproduction unit like a compact disk (called as CD hereinafter) player and a CD changer. The CD changer accommodates a plurality of CDs as record mediums to reproduce selected information according to an instruction of a car occupant. The information is output as an audio one from a speaker of the reproduction unit.

The CD player or the CD changer has a record medium insertion opening for entry of a plurality of CDs. The insertion opening has a door to prevent dust and contaminants from coming into the CD changer.

Some of the CD players or the CD changers have a closure assembly for inserting CD in a main housing thereof, in which a vehicle occupant pushes CD onto a door panel of the main housing. A record medium insertion opening 109 of a conventional closure assembly 101 illustrated in FIGS. 20 to 23 is opened to allow insertion of CD only when the occupant operates an associated switch.

The closure assembly 101, which opens a record medium insertion opening 119 (shown in FIGS. 22 and 23) only when the switch has been operated, has a door 113 to close and open the insertion opening 119, a gear 115, an actuating member 107 positioned within the main housing, etc.

Figure 20:
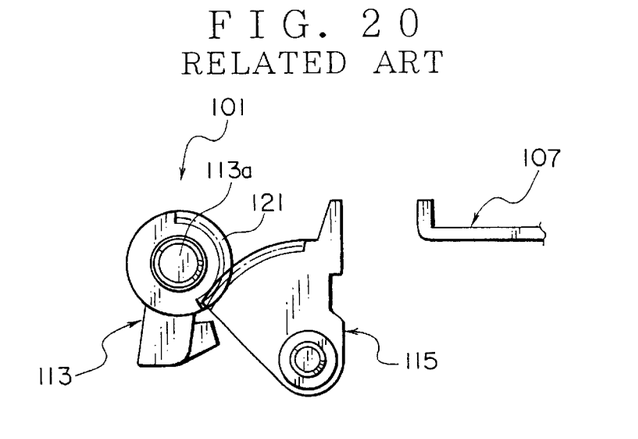
FIG. 20 is an illustrative side view showing a conventional closure assembly, in which a front door has been closed.
Figure 21:
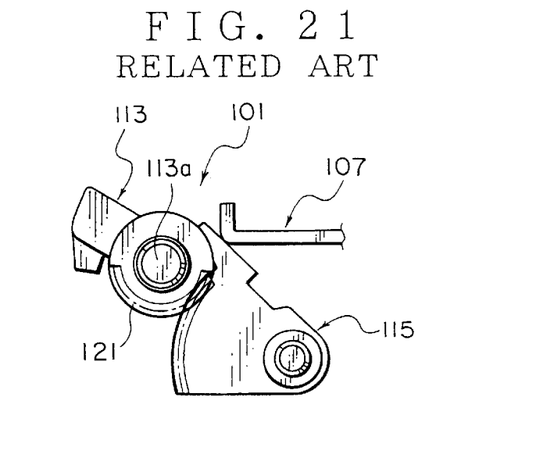
FIG. 21 is an illustrative side view showing the conventional closure assembly of FIG. 20, in which the front door is open.

The door 113 is a plate bar and is turnably supported at an end 113a thereof to open and close the insertion opening 119. The door 113 unitarily has a gear 121 at the end 113a as illustrated in FIGS. 20 and 21.

Figure 22:
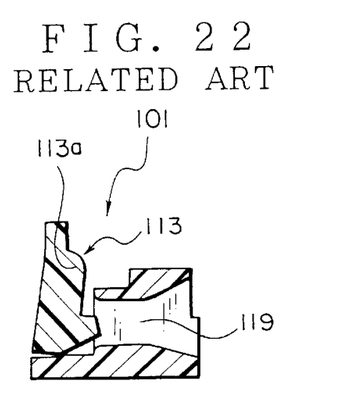
FIG. 22 is a sectional view showing the conventional closure assembly of FIG. 20, in which the front door is closed.

The gear 115 is turnable and engages with the gear 121. The door 113 and the gear 115 are resiliently biased in a direction such that the door 113 closes the insertion opening 119. The door 113 and the gear 115 close the insertion opening 119 when they are apart from the actuating member 107 as illustrated in FIGS. 20 and 22.

Figure 23:
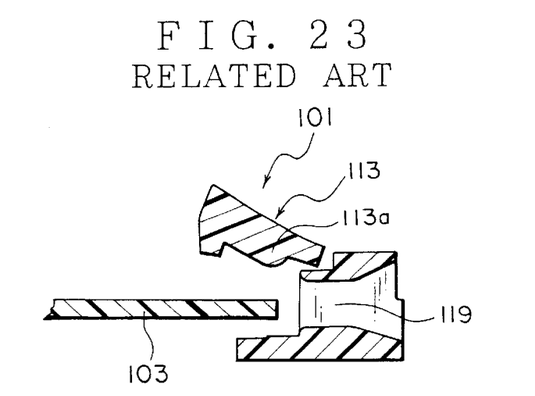
FIG. 23 is a sectional view showing the conventional closure assembly of FIG. 20, in which the front door is open.

The actuating member 107 is slidable in the main housing so as to move inward and outward in the main housing. The actuating member 107 contacts the gear 115 when extended from the main housing, so that, as illustrated in FIGS. 21 and 23, the gear 115 turns the door 113 to open the insertion opening 119.

In response to the operation of the switch, in the closure assembly 101, the actuating member 107 moves to extend from the main housing so as to turn the gear 115 so that the door 113 opens the insertion opening 119. Thereby, the occupant can insert CDs 103 into the main housing or remove them from the main housing.

The closure assembly 101 is resiliently biased only such that the door 113 closes the insertion opening 119. Meanwhile, an vehicle occupant, who tends to insert CD 103 into the CD changer by pushing the door 113 with CD 103, may try to insert CD 103 in the same way, even when the main housing is not in a state to allow entry of CD 103 into main housing.

As described above, the conventional closure assembly 101 has the disadvantage that the record medium is undesirably received when the main housing is not in a state to allow entry of CD 103 into the main housing through the insertion opening 119.

SUMMARY OF THE INVENTION

Therefore, an object of the present invention is to provide an closure assembly for a record medium entry passage of a record medium reproduction unit, which can surely prevent entry of a record medium except when the record medium is allowed to enter a main housing of the unit.

For achieving the object, a first aspect of the invention is a mechanism for opening and closing a record medium entry passage to load and unload a main housing of a record medium reproduction unit with a record medium. The mechanism includes:

an entry opening for passing the record medium, a stopper panel movable between a preventing position to prevent entry of the record medium through the entry passage into the main housing and an allowing position to allow entry of the record medium through the record medium into the main housing, and an actuating mechanism for moving the stopper panel between the preventing position and the allowing position, wherein, the actuating mechanism moves the stopper panel from the preventing position to the allowing position when the main housing is loaded or unloaded with the record medium, and the stopper panel prevents entry of the record medium into the main housing when the stopper panel is at the preventing position.

Thus, the actuating mechanism moves the stopper panel to the preventing position to prevent entry of the record medium into the main housing. That is, the stopper panel prevents entry of the record medium into the main housing except when the actuating mechanism moves the stopper panel to the allowing position to allow entry of the record medium. This prevents an incorrect insertion of the record medium.

A second aspect of the invention is a mechanism for opening and closing a record medium entry passage to load and unload a main housing of a record medium reproduction unit with a record medium. The mechanism includes:

an entry opening for passing the record medium, a closing unit to open and close the entry opening a stopper panel movable between a preventing position to prevent entry of the record medium through the record medium into the main housing and an allowing position to allow entry of the record medium through the record medium into the main housing, the stopper panel being independent from the closing unit, and an actuating mechanism for moving the stopper panel between the preventing position and the allowing position, wherein the actuating mechanism moves the closing unit to open the insertion opening simultaneously with the movement of the stopper panel from the preventing position to the allowing position, and the actuating mechanism moves the closing unit to close the insertion opening simultaneously with the movement of the stopper panel from the allowing position to the preventing position.

Thus, the closing unit and the stopper panel are movable independently from each other. Thereby, the stopper panel surely stays at the preventing position except when the actuating mechanism moves the closing unit to open the insertion opening and moves the stopper panel to the allowing position. Accordingly, an incorrect insertion of the record medium into the record medium reproduction unit is prevented.

Preferably, the stopper panel is positioned inward from the closing unit within the main housing.

Thereby, the stopper panel surely stays at the preventing position except when the actuating mechanism moves the closing unit to open the insertion opening and moves the stopper panel to the allowing position. Accordingly, an incorrect insertion of the record medium into the record medium reproduction unit is prevented.

According to a further feature of the present invention, the mechanism has a plurality of peripheral walls surrounding the insertion opening, one of which has a hole, and the stopper panel has a hook received in both the insertion opening and the hole at the preventing position, while the hook can be positioned outside both the insertion opening and the hole at the allowing position.

Thus, at the preventing position, the hook of the stopper panel enters the hole of the peripheral wall, so that the stopper panel can not be moved to the allowing position by the insertion of the record medium.

According to a further feature of the present invention, the closing unit has a door panel with a pivot shaft extended in a lateral direction of the insertion opening such that the door panel is turnable around the pivot shaft to open and close the insertion opening, and the closing unit has a door panel moving gear for turning the door panel to open and close the insertion opening. The stopper panel has the hook and a cam member, the stopper panel being movable around the pivot shaft between the preventing position and the allowing position, the stopper panel moved by the turning of the cam member. The actuating mechanism has an actuating member slidingly moving outward in the main housing and a biasing spring biasing the stopper panel toward the preventing position. Thereby, the actuating member moves outward within the main housing to turn both the door panel moving gear and the cam member so that the door panel and the stopper panel turn around the pivot shaft to open the insertion opening and to move the stopper panel from the preventing position to the allowing position. Meanwhile, the actuating member moves inward within the main housing to be apart from both the door panel moving gear and the cam member so that the door panel closes the insertion opening and to move the stopper panel from the preventing position to the allowing position, and the biasing spring biases the stopper panel from the allowing position to the preventing position simultaneously with the closure of the record medium insertion opening by the door panel.

Thus, the biasing spring biases the stopper panel to the preventing position, so that the stopper panel prevents entry of the record medium into the main housing. Furthermore, the actuating member moves the door panel to open the insertion opening simultaneously with the movement of the stopper panel from the preventing position to the allowing position. This allows a sure insertion of the record medium into the main housing.

A third aspect of the invention is a mechanism for opening and closing a record medium entry passage to load and unload a main housing of a record medium reproduction unit with a record medium. The mechanism includes:

an entry opening for passing the record medium, a stopper panel movable between a preventing position to prevent entry of the record medium through the record medium into the main housing and an allowing position to allow entry of the record medium through the record medium into the main housing, and an engaging mechanism for preventing the stopper panel from moving toward the allowing position when the stopper panel is pushed inward within the main housing at the preventing position.

Thus, at the preventing position, the engaging mechanism prevents the stopper panel from moving toward the allowing position. Thereby, the engaging mechanism surely prevents the stopper panel from moving toward the allowing position against an force exerted by an incorrect insertion of the record medium. That is, the stopper panel prevents entry of the record medium into the main housing except when the actuating mechanism moves the stopper panel to the allowing position to allow entry of the record medium. This prevents an incorrect insertion of the record medium.

According to a further feature of the present invention, the mechanism has a plurality of peripheral walls surrounding the insertion opening, one of which has a hole, and the stopper panel has a hook received in both the insertion opening and the hole at the preventing position, while the hook can be positioned outside both the insertion opening and the hole at the allowing position. The engaging mechanism has a dent formed in a surface of the hook and a protrusion formed on an inner surface of the hole so as to be engageable with the hook. Thereby, the protrusion engages with the dent at the preventing position when the hook is pushed inward within the main housing.

Thus, the engaging mechanism has the dent formed on the hook and the protrusion formed on the hole. Pushing the hook inward within the main housing causes the protrusion to engage with the dent. The engagement of the protrusion with the dent surely prevents the hook from coming out from the hole even when an incorrect insertion of the record medium pushes the stopper panel. Accordingly, an undesired insertion of the record medium is surely prevented.

According to a further feature of the present invention, the mechanism has a plurality of peripheral walls surrounding the insertion opening, one of which has a hole, and the stopper panel has a hook received in both the insertion opening and the hole at the preventing position, while the hook can be positioned outside both the insertion opening and the hole at the allowing position. The engaging mechanism has a first protrusion formed on an inner wall of the hole so as to protrude toward the hook and a second protrusion formed on a surface of the hook at an inward side within the main housing so as to be extended inward in the main housing. The first protrusion engages with the second protrusion at the preventing position so as to prevent the turning of the hook when the hook is pushed inward within the main housing.

Thus, the engagement of the first and second protrusions prevents the hook from coming out from the hole even when an incorrect insertion of the record medium pushes the stopper panel. This surely prevents the stopper panel from moving toward the allowing position. Thereby, an undesired insertion of the record medium is surely prevented.

According to a further feature of the present invention, the mechanism has a plurality of peripheral walls surrounding the insertion opening, one of which has a hole, and the stopper panel has a hook received in both the insertion opening and the hole at the preventing position, while the hook can be positioned outside both the insertion opening and the hole at the allowing position. The engaging mechanism has a dent formed in a surface of the hook. Thereby, a peripheral portion of the hole engages with the dent at the preventing position to prevent the turning of the hook when the hook is pushed inward within the main housing.

Thus, the engagement of the peripheral portion with the dent surely prevents the hook from coming out from the hole even when an incorrect insertion of the record medium pushes the stopper panel. Accordingly, an undesired insertion of the record medium is surely prevented.

DETAILED DESCRIPTION OF THE PREFERRED EMBODIMENTS

Figures 1, 5:
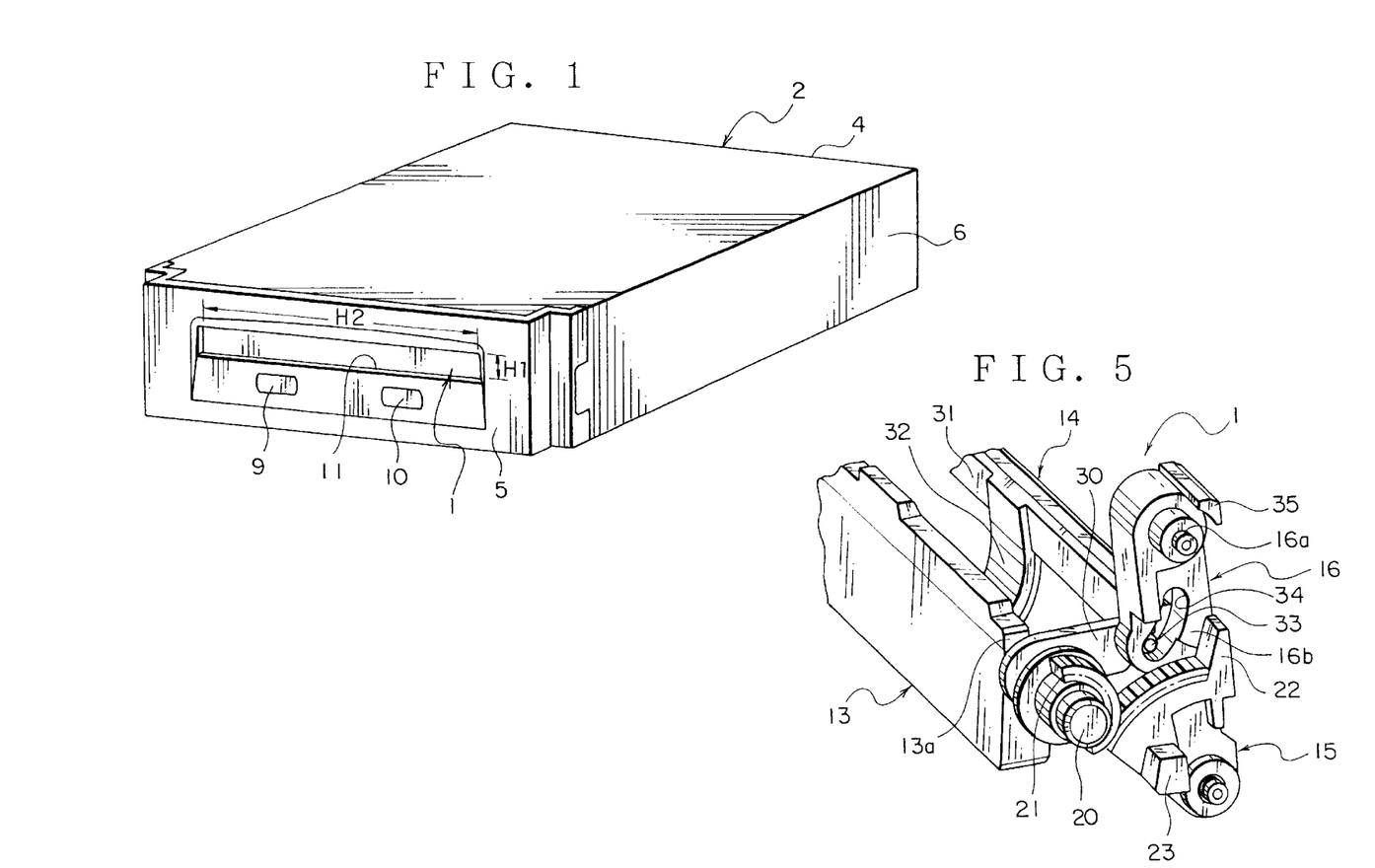
FIG. 1 is a perspective view showing a first embodiment of a closure assembly for a record medium entry passage of a CD changer according to the present invention.
FIG. 5 is an enlarged perspective view showing a part of FIG. 4 which is surrounded by a circle V.

Referring to FIGS. 1 to 13, a closure assembly 1 for a record medium entry passage of a first embodiment according to the present invention will be discussed. In FIG. 1, there is illustrated a CD changer 2 which is a record medium reproduction unit. The CD changer 2 is mounted, for example, in an automobile.

The CD changer 2 accommodates a plurality of compact disks (called CD hereinafter) 3 (see FIGS. 9 and 10), which are record mediums, to selectively reproduce information recorded in a desired one of CDs 3. The reproduced information is output as an audio one from a speaker. An occupant in the car can listen to the audio information recorded in the desired one of CDs 3.

Figure 2:
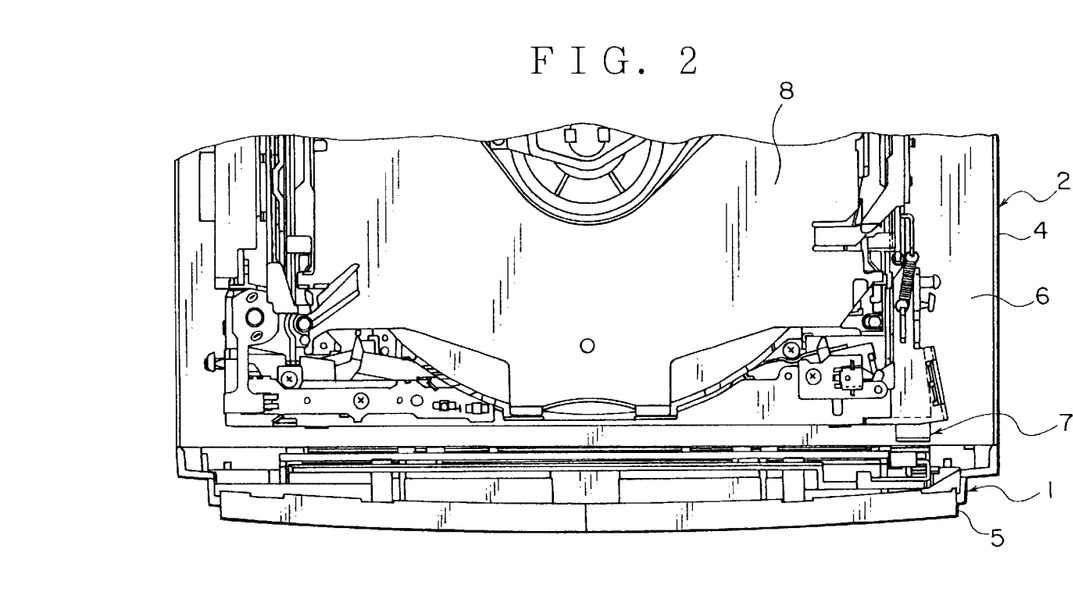
FIG. 2 is a plan view showing the CD changer of FIG. 1, which illustrates an actuating member of the mechanism and etc.

The CD changer 2, as illustrated in FIGS. 1 and 2, has a main housing 4, a front panel 5 attached to the main housing 4, and the closure assembly 1 for the entry passage. The main housing 4 defining a box has a case 6, various kinds of functional parts received in the case, and a record medium retaining section 8 disposed in the case.

The functional parts serve to reproduce information stored in CD 3. The record medium retaining section 8 holds a plurality of CDs 3 which have been received in the case of the main housing 4 through a record medium insertion opening 19 discussed later.

In the case, there is provided an actuating member 7 constituting the closure assembly 1. The actuating member 7 is generally a flat bar. As best shown in FIG. 2, the actuating member 7 is disposed to come close to and away from the front panel 5 within the case.

The actuating member 7 is slidingly moved by a actuating force of a motor (not shown) disposed in the case to come close to and apart from the front panel 5. When the actuating member 7 comes close to the front panel 5, the actuating member 7 abuts both against an action portion 22 of a door panel moving gear 15 (discussed later) of the closure assembly 1 and against another action portion 16b which is an end of a stopper moving cam 16 (discussed later). The actuating member 7 pushes both the action portions 22, 16b to move them outward in the case. The actuating member 7 can also move away from the front panel 5 to be apart from the action portions 22, 16b.

It is noted that, in the embodiment, when the actuating member 7 moves apart from the front panel 5, the actuating member 7 moves inward within the main housing 4, while the actuating member 7 moves outward within the main housing 4 to come close to the front panel 5.

The front panel 5 is positioned in a fore side of the case of the main housing 4 as illustrated in FIG. 1. The front panel 5 is generally rectangular in a front view thereof. The front panel 5 is mounted with exposed switches 9, 10 to receive CD 3 in the record medium retaining section 8 within the main housing 4 and to eject CD 3 from the main housing 4.

The front panel 5 is formed with a record medium entry opening 11 contiguous with the insertion opening 19 of the closure assembly 1. The entry opening 11 is generally rectangular and penetrates through the front panel 5. The entry opening 11 is elongated in a transverse direction of the CD changer 2.

The entry opening 11 has a height H1 larger than the thickness of CD 3 and a length H2 larger than the diameter of CD 3. The entry opening 11 has dimensions almost equal to or a little larger than those of the insertion opening 19 of the closure assembly 1.

The front panel 5 is attached to the case of the main housing 4 to partially define an outer wall of the CD changer 2.

Figures 3, 4:
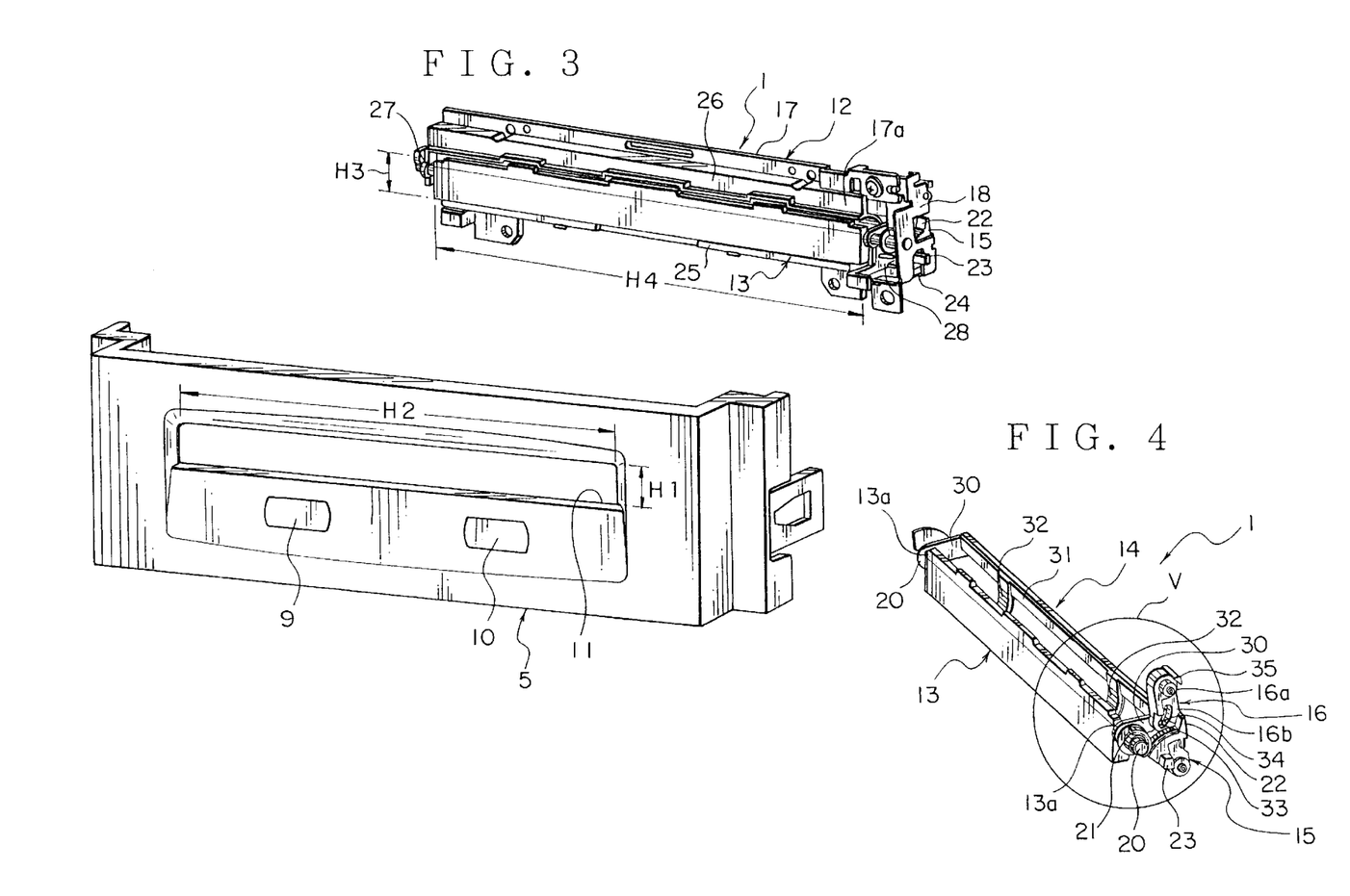
FIG. 3 is a perspective view showing the closure assembly and a front panel of the CD changer of FIG. 1.
FIG. 4 is a perspective view showing a door panel and a stopper panel, which have been assembled with the closure assembly of FIG. 3.

The closure assembly 1 is attached to the front panel 5 on an inner surface thereof. As illustrated in FIGS. 3 to 5, the closure assembly 1 has the actuating member 7, a frame 12, a door panel 13, the door panel moving gear 15, a stopper panel 14, and the stopper moving cam 16.

The frame 12 is made of a synthetic resin material and has, as illustrated in FIG. 3, a rectangular frame body 17 and a second frame piece 18. The frame body 17 has beams 25, 26, 27, and 28 to define the rectangle. These beams 25, 26, 27, and 28 define peripheral walls surrounding the insertion opening 19.

Figure 9:
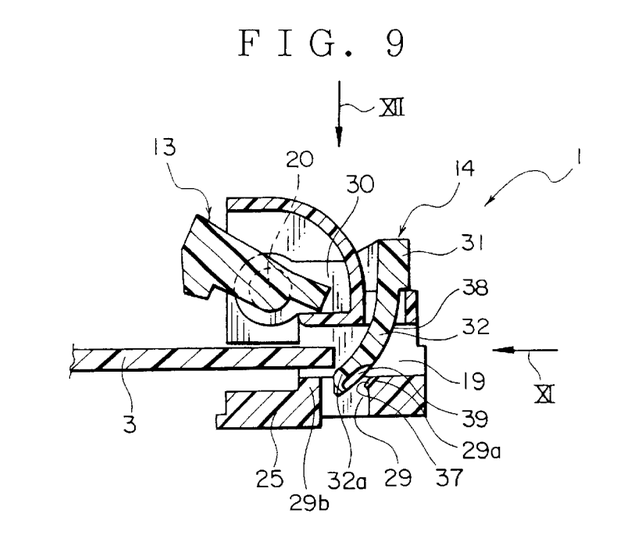
FIG. 9 is a sectional view showing a state in which the door panel has opened the insertion opening.
Figure 10:
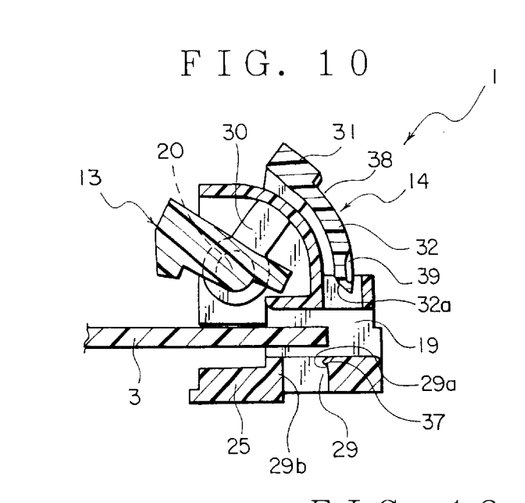
FIG. 10 is a sectional view showing a state in which the door panel has opened the insertion opening and the hook of the stopper panel has moved out of the insertion opening.

The beam 25 has a plurality of holes 29 (see FIGS. 9 and 10). The holes 29 are spaced one another in a lateral direction of the CD changer 2. Each hole 29 is located in a lower side of the CD changer 2 and can receive a hook 32 described later of the stopper panel 14. The four beams 25, 26, 27, and 28 of the frame body 17 surround a space to define the insertion opening 19.

The insertion opening 19 is rectangular to be elongated in a lateral direction of the CD changer 2. The insertion opening 19 has a height H3 larger than CD 3 and an elongated dimension H4 larger than the diameter of CD 3.

Figure 12:
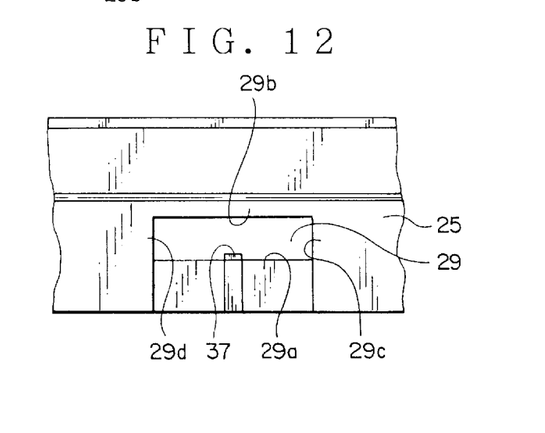
FIG. 12 is a plan view showing a beam having a hole of the closure assembly.

As illustrated in FIG. 12, the hole 29 is rectangular in a view taken in an arrow XII direction (downward) of FIG. 9. The hole 29 is elongated in a lateral direction of the CD changer 2. The hole 29 has peripheral walls 29a, 29b, 29c, and 29d. The peripheral wall 29a is positioned most remote from the front panel 5 among the walls 29a, 29b, 29c, and 29d and has a protrusion 37.

The protrusion 37 projects from the peripheral wall 29a toward the front panel 5 within the hole 29. Thus, the protrusion 37 is located inside the hook 32 of the stopper panel 14 within the main housing 4 to be able to be opposed to the hook 32 which is insertable into the hole 29.

When the closure assembly 1 is attached to the front panel 5, the insertion opening 19 aligns with the entry opening 11. The entry opening 11 and the insertion opening 19 define the entry passage described in the invention summary.

The second frame piece 18 is attached to the frame body 17. The second frame piece 18 is made from a metal plate and is fitted to an end 17a of the frame body 17 in a vertical direction of the CD changer 2. The second frame piece 18 positions the door panel moving gear 15 and the stopper moving cam 16 between the frame body 17 and the second frame piece 18. The second frame piece 18 has a hole 24.

The door panel 13 is a bar plate and is almost equal to or slightly smaller than the insertion opening 19. The door panel 13 is positioned to close the insertion opening 19. As illustrated in FIGS. 4 and 5, the door panel 13 has a pair of pivot shafts 20 each extended from each longitudinal end of the panel 13.

Each pivot shaft 20 is extended from each end 13a of the door panel 13 in a lateral direction of the insertion opening 19. In the illustrated embodiment, the end 13a is positioned at an upper portion of the door panel 13. The end 13a substantially aligns with a lateral end of the insertion opening 19.

The door panel 13 is supported by the frame body 17 turnably around the pivot shafts 20. Thereby, the door panel 13 can open and close the insertion opening 19.

One of the pivot shafts 20, which is positioned near the end 17a of the frame body 17 when the door panel 13 is attached to the frame body 17, has a gear 21 unitarily formed therewith. The gear 21 is co-axial with the pivot shaft 20, that is, with a turning axis of the door panel 13.

The door panel moving gear 15 is turnably supported by the second frame piece 18. The door panel moving gear 15 engages with the gear 21. The door panel moving gear 15 turns the door panel 13 around the pivot shafts 20 to open the insertion opening 19. The door panel moving gear 15 is resiliently biased by a torsion spring (not shown) in a direction to close the insertion opening 19 by the door panel 13.

The door panel moving gear 15 has the action portion 22 apart from its turning center and extended from a periphery of the gear 15. The door panel moving gear 15 also has a stopper projection 23 positioned near the turning center and outwardly projected in a lateral direction of the CD changer. The action portion 22 can abut against the actuating member 7 moving toward the front panel 5 within the case of the main housing 4.

The stopper projection 23 extends from the second frame piece 18 through the hole 24 in a lateral outward direction of the CD changer 2 when the door panel moving gear 15 is turnably fitted to the second frame piece 18. The stopper projection 23 received in the hole 24 limits the turning of the door panel moving gear 15 such that the door panel 13 is only movable between its open and closed positions of the insertion opening 19. Note that the door panel 13 and the door panel moving gear 15 correspond to the closing unit described in the invention summary.

The stopper panel 14 is made of a synthetic resin material. As illustrated in FIGS. 4 and 5, the stopper panel 14 has a pair of support pieces 30, a plate bar 31, a plurality of the hooks 32, and an actuating pin 33. The support piece 30 has generally a hook shape and is turnably retained by the pivot shaft 20. Note that the support piece 30 is turnable around the pivot shaft 20 independently from the door panel 13.

The plate bar 31 joins the pair of the support pieces 30 and is disposed parallel to the door panel 13 in the longitudinal direction thereof.

The hooks 32 are spaced from each other in the elongated direction of the plate bar 31, that is, in a lateral direction of the CD changer 2. As illustrated in FIGS. 6 to 10, each hook 32 is defined in an arc in a side view of the CD changer 2. The hook 32 is extended from the plate bar 31 toward the beam 25 having the holes 29 when the support piece 30 has been fitted to the pivot shaft 20. The hook 32 is resilient such that a free end 32a of the hook 32 extended from the plate bar 31 can deflect inward within the main housing 4.

Figure 11:
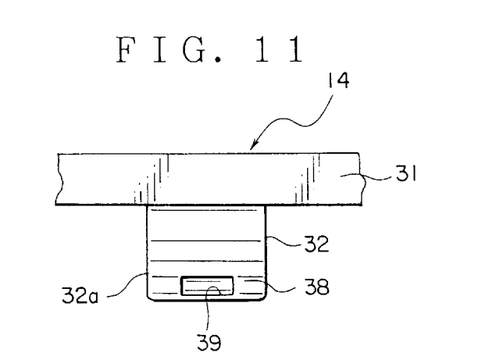
FIG. 11 is a rear view showing the stopper panel of the closure assembly.

As illustrated in FIG. 11, the hook 32 has a dent 39 formed in a surface 38 thereof. The surface 38 is an inner one of the hook 32 within the main housing 4 to be opposed to an arrow head XI of FIG. 9. That is, the surface 38 is a rear face of the hook 32 relative to the front panel 5. The dent 39 which is concave is positioned at the end portion 32a of the hook 32. The dent 39 is opposed to the protrusion 37 when the hook 32 enters the hole 29 as illustrated in FIG. 9.

The protrusion 37 and the dent 39 correspond to the engaging mechanism described in the invention summary.

When the hook 32 has entered the hole 29, the hook 32 also is positioned in the insertion opening 19. That is, the stopper panel 14 is at the preventing position described in the invention summary as best shown in FIG. 9.

At the preventing position of the stopper panel 14, the plate bar 31 and the hooks 32 are located inside the door panel 13 within the main housing 4.

Figure 13:
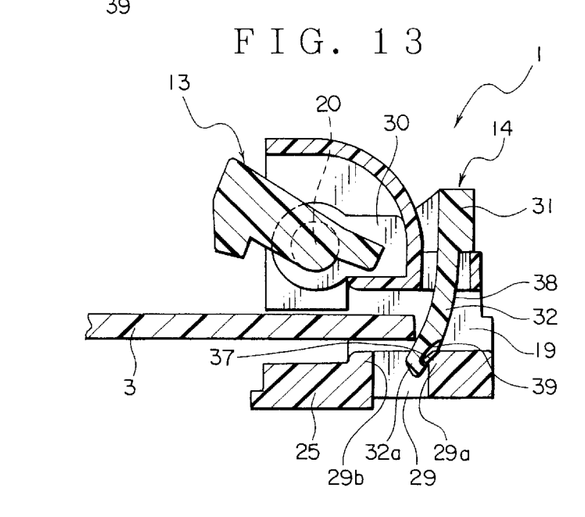
FIG. 13 is a sectional view showing a state in which a dent of the stopper panel has received a protrusion formed in the hole of the closure assembly.

Furthermore, at the preventing position, the end portion 32a of the hook 32 resiliently deflects to come close to the peripheral wall 29 when the insertion of CD 3 pushes the hook inward within the main housing 4. Thereby, the protrusion 37 enters the dent 39 as best shown in FIG. 13.

The mating of the dent 39 with the protrusion 37 prevents the hook 32 at the preventing position from moving out of the insertion opening 19 and also prevents the stopper panel 14 from turning around the pivot shafts 20.

The actuating pin 33 is extended outward near the end portion 17a of the frame body 17 in a lateral direction of the CD changer 2 when the support piece 30 has been assembled with the door panel 13. The actuating pin 33 is received in an elongated hole 34 discussed later of the stopper moving cam 16.

The stopper panel 14 is turnable around the pivot shafts 20 independently from the door panel 13 when the support piece 30 has been coupled to the pivot shaft 20. The turning of the stopper panel 14 around the pivot shafts 20 causes the hook 32 to enter both the insertion opening 19 and the hole 29 to reach the preventing position and to move out of the preventing position.

When the hook 32 has moved out of both the insertion opening 19 and the hole 29 as best shown in FIG. 10, the stopper panel 14 is at the allowing position described in the invention summary. The stopper panel 14 is movable between the preventing position and the allowing position independently from the opening and closing movement of the door panel 13.

When stopper panel 14 is at the preventing position where the hook 32 has been received in both the insertion opening 19 and the hole 29, the stopper panel 14 prevents CD 3 from passing through the insertion opening 19.

When the stopper panel 14 is at the allowing position where the hook 32 has moved outside both the record medium the insertion opening 19 and the holes 29, the stopper panel 14 allows CD 3 to pass through the insertion opening 19 into the main housing 4.

The stopper moving cam 16 is generally defined in an elongated circle in a side view thereof. The stopper moving cam 16 is supported by the second frame piece 18 turnably around an end 16a thereof. The stopper moving cam 16 is formed with the elongated hole 34 and a stopper projection 35.

The elongated hole 34 is disposed in another end portion 16b of the stopper moving cam 16. The elongated hole 34 consists of a plurality of arcs in a side view thereof. The elongated hole 34 receives the actuating pin 33. When the stopper moving cam 16 turns around the end 16a, the actuating pin 33 slidingly moves within the elongated hole 34, so that the stopper panel 14 moves between the preventing position and the allowing position.

The stopper moving cam 16 is resiliently biased by a torsion spring 36 (see FIG. 6 or 7) of a biasing spring such that the hook 32 moves to enter the insertion opening 19. That is, the torsion spring 36 resiliently biases the stopper panel 14 toward the preventing position. The end portion 16b of the stopper moving cam 16 can abut against the actuating member 7 extended within the main housing 4. The end portion 16b corresponds one of the action portions described above.

The actuating member 7 and the torsion spring 36 correspond to the actuating mechanism described in the invention summary. The actuating member 7 moves the door panel 13 to open the record medium the insertion opening 19, and at the same time, the actuating member 7 moves the stopper panel 14 from the preventing position to the allowing position.

The stopper projection 35 is extended outward from the end portion 16a in a lateral direction of the CD changer 2. The stopper projection 35 contacts a periphery of the second frame piece 18 when the stopper moving cam 16 has been turnably attached to the second the frame piece 18. The stopper projection 35 limits the movement of the stopper moving cam 16 such that the stopper moving cam 16 can move the hook 32 of the stopper panel 14 between the closed and open states of the insertion opening 19.

The stopper panel 14 and the stopper moving cam 16 correspond to the stopper panel described in the invention summary.

The closure assembly 1 is fitted to the front panel 5 and the front panel 5 is secured to the main housing 4 to finish the CD changer 2. In the CD changer 2, the actuating member 7 is apart from the front panel 5 within the main housing 4 except when CD 3 moves into or out of the main housing 4.

Figure 6:
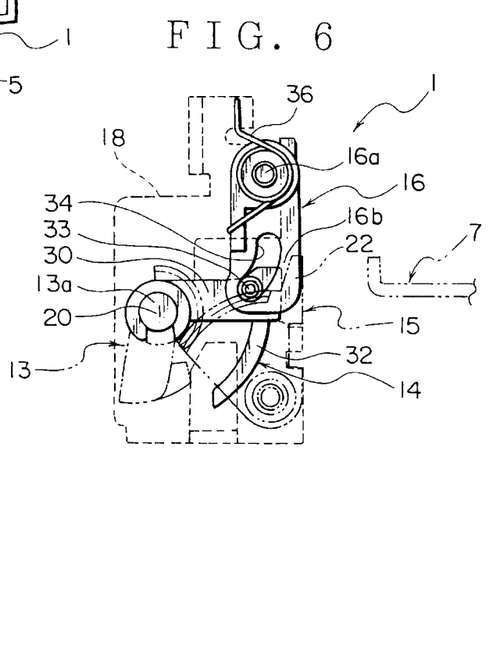
FIG. 6 is an illustrative side view showing a state in which the door panel has closed a record medium insertion opening and a hook of the stopper panel has entered the insertion opening.

In FIG. 6, the actuating member 7 is apart from both the action portion 22 of the door panel moving gear 15 and the end portion 16b of the stopper moving cam 16. The force of the biasing spring moves the door panel 13 to close the insertion opening 19. Meanwhile, the biasing force of the torsion spring 36 moves the hook 32 of the stopper panel 14 to enter both the insertion opening 19 and the hole 29 to reach the preventing position.

Then, the depression of the switch 9 causes the actuating member 7 to gradually move toward the front panel 5. Thereby, the actuating member 7 abuts against both the action portion 22 and the end portion 16b. The actuating member 7 pushes the action portion 22 toward the front panel 5, that is, outward in the main housing 4 against the force of the biasing spring. The actuating member 7 also pushes the end portion 16b toward the front panel 5 against the biasing force of the torsion spring 36.

Figure 7:
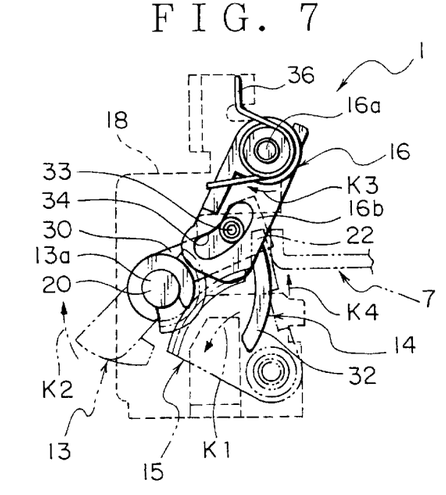
FIG. 7 is an illustrative side view showing a state in which the door panel is gradually opening the insertion opening and the hook of the stopper panel is gradually moving out of the insertion opening.

Thus, as illustrated in FIG. 7, the door panel moving gear 15 turns in a direction shown by an arrow head K1, so that the door panel 13 turns in a direction shown by an arrow head K2 around the pivot shafts 20. Thereby, the door panel 13 opens gradually the insertion opening 19. Furthermore, the stopper moving cam 16 turns in a direction shown by an arrow head K3 around the end portion 16a, so that the stopper panel 14 turns in a direction shown by an arrow head K4 around the pivot shafts 20, so that the hook 32 of the stopper panel 14 moves out of the hole 29 to gradually move out of the insertion opening 19.

Figure 8:
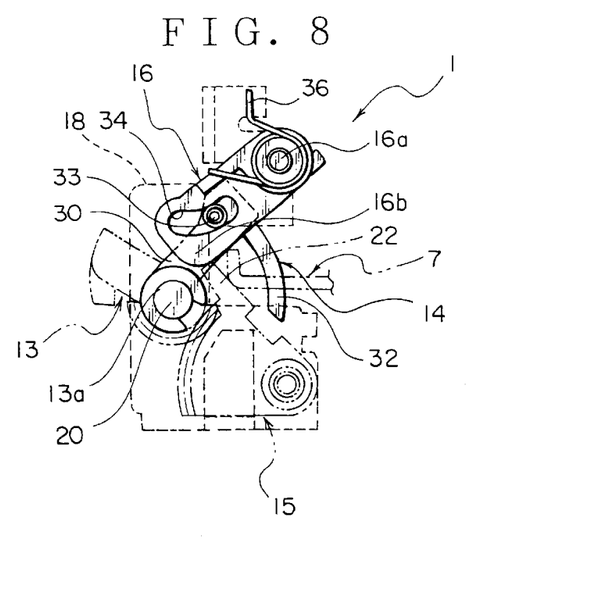
FIG. 8 is an illustrative side view showing a state in which the door panel has opened the insertion opening and the hook of the stopper panel has moved out of the insertion opening.

As illustrated in FIG. 8, a further forward movement of the actuating member 7 within the main housing 4 causes the door panel 13 to open the insertion opening 19 and to completely move the hook 32 of the stopper panel 14 out of the insertion opening 19. Thus, as illustrated in FIG. 10, the door panel 13 and the hook 32 of the stopper panel 14 open the insertion opening 19.

CD 3 is inserted through the insertion opening 19 into the main housing 4 to be received in the record medium retaining section 8 or is moved out of the record medium retaining section 8. The depression of the switch 10 gradually moves the actuating member 7 inward within the main housing 4, so that the force of the biasing spring turns the door panel 13 to close the insertion opening 19 and the hook 32 of the stopper panel 14 enters into the insertion opening 19. In FIGS. 6 to 8, the stopper panel 14, stopper moving cam 16, and torsion spring 36 are illustrated by solid lines, while the door panel 13, door panel moving gear 15, and actuating member 7 are illustrated by chain lines. Furthermore, the second frame piece 18 is illustrated by dotted lines.

As described above, in the inserting or ejecting step of CD 3 relative to the main housing 4, the actuating member 7 moves both the stopper panel 14 and the stopper moving cam 16 from the allowing position to the preventing position so that the stopper panel 14 prevents CD 3 from entering the main housing 4.

The outward movement of the actuating member 7 within the main housing 4 turns the door panel moving gear 15 and the stopper moving cam 16, so that the door panel 13 and the stopper panel 14 turn around the pivot shafts 20. Thereby, the door panel 13 opens the insertion opening 19, and the stopper panel 14 moves from the preventing position toward the allowing position.

On the contrary, the inward movement of the actuating member 7 within the main housing 4 causes itself to be apart from both the door panel moving gear 15 and the stopper moving cam 16, so that the door panel 13 closes the insertion opening 19. At the same time, the biasing force of the torsion spring 36 moves the stopper panel 14 from the allowing position to the preventing position.

In the embodiment, the stopper panel 14 located at the preventing position prevents CD 3 from entering the main housing 4. Thus, an incorrect insertion of CD 3 is eliminated except when the actuating member 7 has moved the stopper panel 14 to the allowing position where the insertion or ejection of CD 3 is allowable relative to the main housing 4.

As best shown in FIG. 9, at the preventing position, the hook 32 of the stopper panel 14 has entered the hole 29 of the beam 25. In this state, the mating of the hook 32 with the hole 29 prevents the stopper panel 14 from moving toward the allowing position even when an incorrect insertion of CD 3 exerts a force to move the stopper panel 14 toward the allowing position. Thus, the incorrect insertion of CD 3 into the main housing 4 is surely prevented when the CD changer 2 is in a state not to receive CD 3.

Moreover, the door panel 13 moves independently from the stopper panel 14. Thus, when the CD changer 2 is in a state not to receive CD 3, the hook 32 of the stopper panel 14 stays in the insertion opening 19 even if the door panel 13 is forcedly opened. Thus, an incorrect insertion of CD 3 into the main housing 4 is further surely prevented.

Meanwhile, when the actuating member 7 moves the door panel 13 to open the insertion opening 19, the stopper panel 14 moves from the preventing position to the allowing position at the same time. Thus, CD 3 can pass surely through the insertion opening 19 when the CD changer 2 is in a state to receive CD 3 or when CD 3 moves out of the CD changer 2.

The embodiment of the closure assembly 1 has the door panel 13 and the stopper panel 14. However, another closure assembly having only the stopper panel 14 without the door panel 13 may be possible according to the present invention.

In the embodiment, the CD changer 2 is discussed as a record medium reproduction unit. In the present invention, the record medium reproduction unit is not limited to the CD changer 2 but may be any one of CD-ROM driving units like a CD player and a car navigation unit.

In the embodiment, the stopper panel 14 is positioned inward from the door panel 13 within the main housing 4.

Thus, the stopper panel 14 closes the insertion opening 19 as illustrated in FIG. 9, except when the actuating member 7 moves the door panel 13 to open the insertion opening 19 and to move the stopper panel 14 to the allowing position for receiving or ejecting CD 3.

Accordingly, the stopper panel 14 prevents CD 3 from entering the main housing 4 except when the CD changer 2 is in a state to receive or eject CD 3.

In the embodiment, the protrusion 37 is formed on the peripheral wall 29a of the hole 29, and the dent 39 is formed in the surface 38 of the hook 32. Alternatively, in the present invention, the peripheral wall 29a may have the dent 39 while the surface 38 may be provided with the protrusion 37.

Next, referring to FIGS. 14 to 16, a closure assembly 1 for a record medium entry passage according to a second embodiment of the present invention will be discussed. Note that a component the same as that of the first embodiment has the same reference numeral and will not be discussed again.

Figure 14:
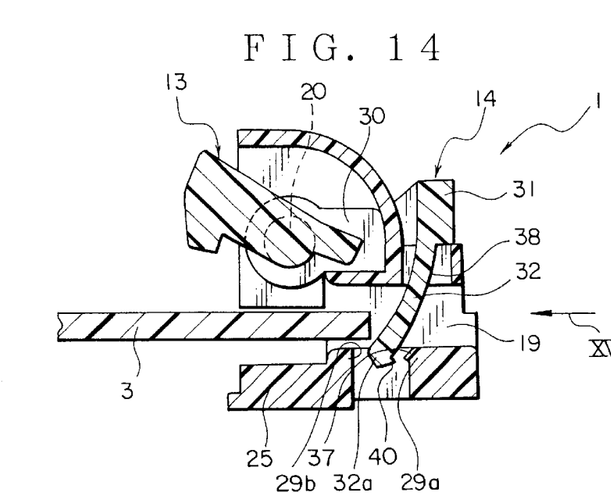
FIG. 14 is a sectional view showing a closure assembly of a second embodiment of the present invention, in which a door panel has opened a record medium insertion opening.
Figure 15:
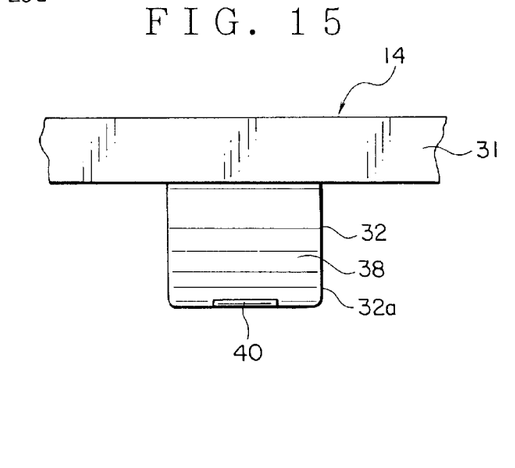
FIG. 15 is a rear view showing a stopper panel of the closure assembly of the second embodiment.

In the second embodiment, as illustrated in FIGS. 14 and 15, the end portion 32a of the hook 32 is provided with a second protrusion 40. FIG. 15 shows the stopper panel 14 taken along an arrow head XV of FIG. 14. The second protrusion 40 protrudes from the surface 38 inward within the main housing 4. The second protrusion 40 abuts against a lower surface of the protrusion 37 when CD 3 pushes the hook 32 inward in the main housing 4 as illustrated in FIG. 16. Note that the protrusions 37 and 40, corresponds to the first and second protrusions described in the invention summary.

The abutment of the second protrusion 40 against the protrusion 37 prevents the hook 32 from moving out of the hole 29 so that the stopper panel 14 is not allowed to turn around the pivot shafts 20. Note that the second protrusion 40 and the protrusion 37 correspond to the engaging mechanism described in the invention summary.

In the same way as the first embodiment, the stopper panel 14 is positioned inward from the door panel 13 within the main housing 4. Thus, the stopper panel 14 closes the insertion opening 19 except when the actuating member 7 moves the door panel 13 to open the insertion opening 19 and to move the stopper panel 14 to the allowing position for receiving or ejecting CD 3. Accordingly, the stopper panel 14 prevents CD 3 from entering the main housing 4 except when the CD changer 2 is in a state to receive or eject CD 3.

Figure 16:
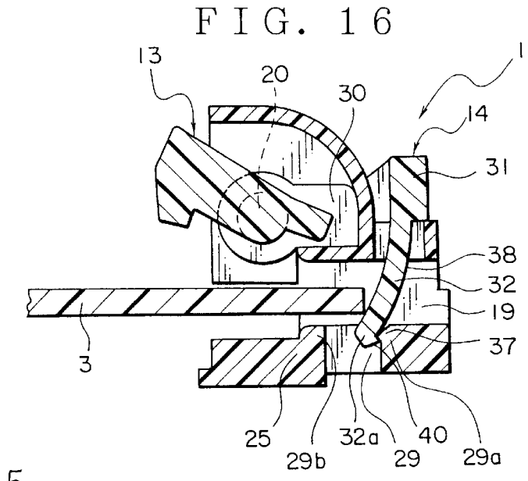
FIG. 16 is a sectional view showing the second embodiment, in which a first protrusion provided in a hole of the closure assembly has engaged with a second protrusion formed on the stopper panel.

At the preventing position of the stopper panel 14, when the hook 32 is pushed inward by an undesired insertion of CD 3 within the main housing 4, the second protrusion 40 abuts against the lower surface of the protrusion 37 as illustrated in FIG. 16. The engagement of the second protrusion 40 formed on the end portion 32a of the hook 32 with the protrusion 37 prevents the hook 32 from coming out from the hole 29. This prohibits the turning of the stopper panel 14 around the pivot shafts 20 to move to the allowing position.

Accordingly, the insertion of CD 3 into the main housing 4 could be surely prevented when the CD changer 2 is in a state not to receive CD 3.

Next, referring to FIGS. 17 to 19, a third embodiment of a closure assembly for the entry passage according to the present invention will be discussed. Note that a component the same as that of the first embodiment has the same reference numeral and will not be discussed again.

Figure 17:
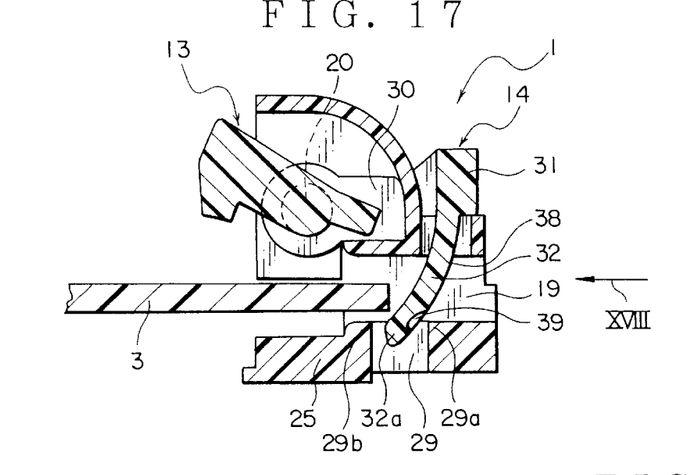
FIG. 17 is a sectional view showing a closure assembly of a third embodiment of the present invention, in which a door panel has opened a record medium insertion opening.
Figure 18:
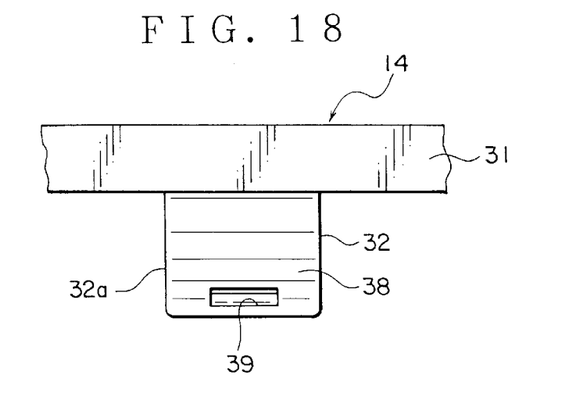
FIG. 18 is a rear view showing a stopper panel of the closure assembly of the third embodiment.
Figure 19:
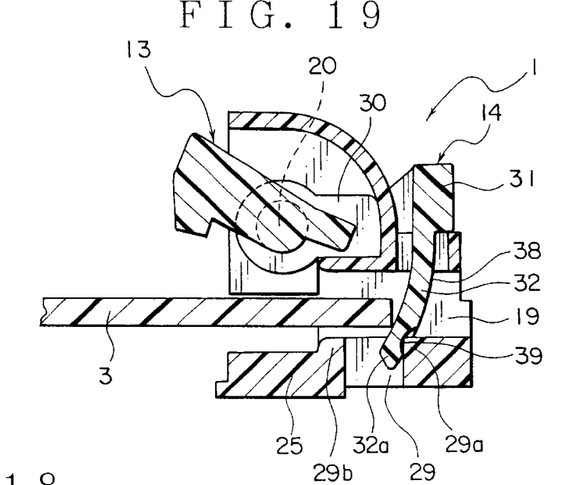
FIG. 19 is a sectional view showing a state in which a dent of the stopper panel has received a corner of the hole of the closure assembly of the third embodiment.

As illustrated in FIGS. 17 and 18, the dent 39 is positioned in the end portion 32a of the hook 32. FIG. 18 is a view taken along an arrow head XVIII of FIG. 17 to show the stopper panel 14. As illustrated in FIG. 19, the dent 39 receives a corner of the peripheral wall 29a when CD 3 undesirably pushes the hook 32 to deflect it inward in the main housing 4.

The engagement of the dent 37 with the corner of the peripheral wall 29 prevents the hook 32 from moving out of the hole 29. This prevents the stopper panel 14 from turning around the pivot shafts 20. Note that the dent 39 corresponds to the engaging mechanism described in the invention summary.

In the same way as the first embodiments, the stopper panel 14 is positioned inward from the door panel 13 within the main housing 4. Thus, the stopper panel 14 closes the insertion opening 19 except when the actuating member 7 moves the door panel 13 to open the insertion opening 19 and to move the stopper panel 14 to the allowing position for receiving or ejecting CD 3. Accordingly, the stopper panel 14 prevents CD 3 from entering the main housing 4 except when the CD changer 2 is in a state to receive or eject CD 3.

At the preventing position of the stopper panel 14, when the hook 32 is pushed inward by an undesired insertion of CD 3 within the main housing 4, the corner of the peripheral wall 29a engages with the dent 39. The engagement prevents the stopper panel 14 from moving to the allowing position. Accordingly, the stopper panel 14 prevents CD 3 from entering the main housing 4 except when the CD changer 2 is in a state to receive or eject CD 3.

In each of the first to third embodiments, the closure assembly has the door panel 13 and the stopper panel 14. However, another closure assembly having only the stopper panel 14 without the door panel 13 may be possible according to the present invention.

In the first to third embodiments, the CD changer 2 is discussed as a record medium reproduction unit. In the present invention, the record medium reproduction unit is not limited to the CD changer 2 but may be any one of CD-ROM driving units like a CD player and a car navigation unit.

What is claimed is:

1. A closure assembly for opening and closing a record medium entry passage to load and unload a main housing of a record medium reproduction unit with a record medium, the closure assembly comprising:

an entry opening for passing the record medium, a stopper panel movable between a preventing position to prevent entry of the record medium through the entry passage into the main housing and an allowing position to allow entry of the record medium through the entry passage into the main housing, and an actuating mechanism for moving the stopper panel between the preventing position and the allowing position, wherein, the actuating mechanism moves the stopper panel from the preventing position to the allowing position when the main housing is loaded or unloaded with the record medium, and the stopper panel prevents entry of the record medium into the main housing when the stopper panel is at the preventing position, and wherein the closure assembly has a plurality of peripheral walls surrounding the entry opening, one of which has a hole, and the stopper panel has a hook received in both the entry opening and the hole at the preventing position, while the hook can be positioned outside both the entry opening and the hole at the allowing position.

2. The closure assembly as claimed in claim 1, comprising:

a closing unit to open and close the entry opening;

wherein the closing unit has a door panel with a pivot shaft extended in a lateral direction of the entry opening such that the door panel is turnable around the pivot shaft to open and close the entry opening, and the closing unit has a door panel moving gear for turning the door panel to open and close the entry opening, the stopper panel having the hook and a cam member, the stopper panel being movable around the pivot shaft between the preventing position and the allowing position, the stopper panel moved by the turning of the cam member, the actuating mechanism having an actuating member slidingly moving outward in the main housing and a biasing spring biasing the stopper panel toward the preventing position, whereby, the actuating member moves outward within the main housing to turn both the door panel moving gear and the cam member so that the door panel and the stopper panel turn around the pivot shaft to open the entry opening and to move the stopper panel from the preventing position to the allowing position, while the actuating member moves inward within the main housing to be apart from both the door panel moving gear and the cam member so that the door panel closes the entry opening and to move the stopper panel from the allowing position to the preventing position, and the biasing spring biases the stopper panel from the allowing position to the preventing position simultaneously with the closure of the insertion opening by the door panel.

3. A closure assembly for opening and closing a record medium entry passage to load and unload a main housing of a record medium reproduction unit with a record medium, the closure assembly comprising:

an entry opening for passing the record medium, a closing unit to open and close the entry opening, a stopper panel movable between a preventing position to prevent entry of the record medium through the record medium into the main housing and an allowing position to allow entry of the record medium through the record medium into the main housing, the stopper panel being independent from the closing unit, and an actuating mechanism for moving the stopper panel between the preventing position and the allowing position, wherein the actuating mechanism moves the closing unit to open the insertion opening simultaneously with the movement of the stopper panel from the preventing position to the allowing position, and the actuating mechanism moves the closing unit to close the insertion opening simultaneously with the movement of the stopper panel from the allowing position to the preventing position, wherein the closure assembly has a plurality of peripheral walls surrounding the insertion opening, one of which has a hole, and the stopper panel has a hook received in both the insertion opening and the hole at the preventing position to prevent entry of the record medium into the main housing, while the hook can be positioned outside both the insertion opening and the hole at the allowing position.

4. The closure assembly as claimed in claim 3 wherein the closing unit has a door panel with a pivot shaft extended in a lateral direction of the entry opening such that the door panel is turnable around the pivot shaft to open and close the entry opening, and the closing unit has a door panel moving gear for turning the door panel to open and close the entry opening, the stopper panel having the hook and a cam member, the stopper panel being movable around the pivot shaft between the preventing position and the allowing position, the stopper panel moved by the turning of the cam member, the actuating mechanism having an actuating member slidingly moving outward in the main housing and a biasing spring biasing the stopper panel toward the preventing position, whereby, the actuating member moves outward within the main housing to turn both the door panel moving gear and the cam member so that the door panel and the stopper panel turn around the pivot shaft to open the entry opening and to move the stopper panel from the preventing position to the allowing position, and the actuating member moves inward within the main housing to be apart from both the door panel moving gear and the cam member so that the door panel closes the entry opening and to move the stopper panel from the allowing position to the preventing position, while the biasing spring biases the stopper panel from the allowing position to the preventing position simultaneously with the closure of the insertion opening by the door panel.

5. A closure assembly for opening and closing a record medium entry passage to load and unload a main housing of a record medium reproduction unit with a record medium, the closure assembly comprising:

an entry opening for passing the record medium, a stopper panel movable between a preventing position to prevent entry of the record medium through the entry passage into the main housing and an allowing position to allow entry of the record medium through the entry passage into the main housing, and an engaging mechanism for preventing the stopper panel from moving toward the allowing position by force which the stopper panel is pushed inward within the main housing when the stopper panel is at the preventing position, wherein the closure assembly has a plurality of peripheral walls surrounding the entry opening, one of which has a hole, and the stopper panel has a hook received in both the entry opening and the hole at the preventing position, while the hook can be positioned outside both the entry opening and the hole at the allowing position, the engaging mechanism having a dent formed in a surface of the hook and a protrusion formed on an inner surface of the hole so as to be engageable with the hook, whereby, the protrusion engages with the dent at the preventing position when the hook is pushed inward within the main housing.

6. A closure assembly for opening and closing a record medium entry passage to load and unload a main housing of a record medium reproduction unit with a record medium, the closure assembly comprising:

an entry opening for passing the record medium, a stopper panel movable between a preventing position to prevent entry of the record medium through the entry passage into the main housing and an allowing position to allow entry of the record medium through the entry passage into the main housing, and an engaging mechanism for preventing the stopper panel from moving toward the allowing position by force which the stopper panel is pushed inward within the main housing when the stopper panel is at the preventing position, wherein the closure assembly has a plurality of peripheral walls surrounding the entry opening, one of which has a hole, and the stopper panel has a hook received in both the entry opening and the hole at the preventing, while the hook can be positioned outside both the entry opening and the hole at the allowing position, the engaging mechanism having a first protrusion formed on an inner wall of the hole so as to protrude toward the hook and a second protrusion formed on a surface of the hook at an inward side within the main housing so as to be extended inward in the main housing, wherein, the first protrusion engages with the second protrusion at the preventing position so as to prevent the turning of the hook when the hook is pushed inward within the main housing.

7. A closure assembly for opening and closing a record medium entry passage to load and unload a main housing of a record medium reproduction unit with a record medium, the closure assembly comprising:

an entry opening for passing the record medium, a stopper panel movable between a preventing position to prevent entry of the record medium through the entry passage into the main housing and an allowing position to allow entry of the record medium through the entry passage into the main housing, and an engaging mechanism for preventing the stopper panel from moving toward the allowing position by force which the stopper panel is pushed inward within the main housing when the stopper panel is at the preventing position, wherein the closure assembly has a plurality of peripheral walls surrounding the entry opening, one of which has a hole, and the stopper panel has a hook received in both the entry opening and the hole at the preventing position, while the hook can be positioned outside both the entry opening and the hole at the allowing position, the engaging mechanism having a dent formed in a surface of the hook, whereby, a peripheral portion of the hole engages with the dent at the preventing position to prevent the turning of the hook when the hook is pushed inward within the main housing.

8. A closure assembly, comprising:

an entry opening for passing a record medium, a door panel to open and close the entry opening, a stopper movable between a preventing position and an allowing position, wherein the stopper prevents entry of the record medium through the entry passage into a main housing when the stopper is in the preventing position and wherein the stopper allows entry of the record medium through the entry passage into the main housing when the stopper is in the allowing position, and an actuating mechanism for moving the stopper between the preventing position and the allowing position, wherein the stopper is turnable around a pivot shaft around which the door panel pivots to open and close the entry opening, and wherein the actuating mechanism moves the stopper from the preventing position to the allowing position when the main housing is loaded or unloaded with the record medium.

9. A closure assembly, comprising:

an entry opening for passing a record medium, a door panel to open and close the entry opening, a stopper movable between a preventing position and an allowing position, wherein the stopper prevents entry of the record medium through the entry passage into a main housing when the stopper is in the preventing position and wherein the stopper allows entry of the record medium through the entry passage into the main housing when the stopper is in the allowing position, and an actuating mechanism for moving the stopper between the preventing position and the allowing position, wherein the stopper is turnable around a pivot shaft around which the door panel pivots to open and close the entry opening, and wherein the actuating mechanism moves the stopper from the preventing position to the allowing position when the door panel opens the entry opening, and the actuating mechanism moves the stopper from the allowing position to the preventing position when the door panel closes the entry opening.

10. A closure assembly for opening and closing a record medium entry passage to load and unload a main housing of a record medium reproduction unit with a record medium, the closure assembly comprising:

an entry opening for passing the record medium, a stopper panel movable between a preventing position to prevent entry of the record medium through the entry passage into the main housing and an allowing position to allow entry of the record medium through the record medium into the main housing, an actuating mechanism for moving the stopper panel between the preventing position and the allowing position, wherein the actuating mechanism moves the stopper panel from the preventing position to the allowing position when the main housing is loaded or unloaded with the record medium, and the stopper panel prevents entry of the record medium into the main housing when the stopper panel is at the preventing position, and a closing unit to open and close the entry opening, wherein the closing unit has a door panel with a pivot shaft extending in a lateral direction of the entry opening such that the door panel is turnable around the pivot shaft to open and close the entry opening, and the closing unit has a door panel moving gear for turning the door paned to open and close the entry opening, the stopper panel having a cam member, the stopper panel being movable around the pivot shaft between the preventing position and the allowing position, the stopper panel moved by the turning of the cam member, the actuating mechanism having an actuating member slidingly moving outward in the main housing and a biasing spring biasing the stopper panel toward the preventing position, whereby, the actuating member moves outward within the main housing to turn both the door panel moving gear and the cam member so that the door panel and the stopper panel turn around the pivot shaft to open the entry opening and to move the stopper panel from the preventing position to the allowing position, while the actuating member moves inward within the main housing to be apart from both the door panel moving gear and the cam member so that the door panel closes the entry opening and to move the stopper panel from the preventing position to the allowing position, and the biasing spring biases the stopper panel from the allowing position to the preventing position simultaneously with the closure of the entry opening by the door panel.

11. A closure assembly for opening and closing a record medium entry passage to load and unload a main housing of a record medium reproduction unit with a record medium, the closure assembly comprising:

an entry opening for passing the record medium, a closing unit to open and close the entry opening, a stopper panel movable between a preventing position to prevent entry of the record medium through the record medium into the main housing and an allowing position to allow entry of the record medium through the record medium into the main housing, and an actuating mechanism for moving the stopper panel between the preventing position and the allowing position, wherein the actuating mechanism moves the closing unit to open the entry opening simultaneously with the movement of the stopper panel from the preventing position to the allowing position, and the actuating mechanism moves the closing unit to close the entry opening simultaneously with the movement of the stopper panel from the allowing position to the preventing position, wherein the closing unit has a door panel with a pivot shaft extended in a lateral direction of the entry opening such that the door panel is turnable around the pivot shaft to open and close the entry opening, and the closing unit has a door panel moving gear for turning the door panel to open and close the entry opening, the stopper panel having a cam member, the stopper panel being movable around the pivot shaft between the preventing position and the allowing position, the stopper panel moved by the turning of the cam member, the actuating mechanism having an actuating member slidingly moving outward in the main housing and a biasing spring biasing the stopper panel toward the preventing position, whereby, the actuating member moves outward within the main housing to turn both the door panel moving gear and the cam member so that the door panel and the stopper panel turn around the pivot shaft to open the entry opening and to move the stopper panel from the preventing position to the allowing position, and the acutuating member moves inward within the main housing to be apart from both the door panel moving gear and the cam member so that the door panel closes the entry opening and to move the stopper panel from the preventing position to the allowing position, while the biasing spring biases the stopper panel from the allowing position to the preventing position simultaneously with the closure of the entry opening by the door panel.

* * * * *